(12) United States Patent
Choi et al.

(10) Patent No.: US 12,542,448 B2
(45) Date of Patent: Feb. 3, 2026

(54) APPARATUS AND METHOD FOR LIMITING OUTPUT CURRENT USING OUTPUT VOLTAGE CONTROL TECHNIQUE

(71) Applicant: HL MANDO CORPORATION, Gyeonggi-do (KR)

(72) Inventors: Bongyeon Choi, Gyeonggi-do (KR); Suwan Woo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 175 days.

(21) Appl. No.: 18/375,458

(22) Filed: Sep. 30, 2023

(65) Prior Publication Data
US 2024/0413659 A1    Dec. 12, 2024

(30) Foreign Application Priority Data

Jun. 12, 2023    (KR) .................. 10-2023-0074814

(51) Int. Cl.
*H02J 7/00*    (2006.01)

(52) U.S. Cl.
CPC ...... *H02J 7/00714* (2020.01); *H02J 7/00304* (2020.01); *H02J 7/007182* (2020.01)

(58) Field of Classification Search
CPC ............... H02J 7/00714; H02J 7/00304; H02J 7/007182
See application file for complete search history.

(56) References Cited

U.S. PATENT DOCUMENTS 10,439,507 B2 * 10/2019 Ramamurthy .......... H02M 1/12
2009/0219049 A1    9/2009 Meagher et al.

FOREIGN PATENT DOCUMENTS

| DE | 10 2021 210 896 | 6/2022 |
| DE | 10 2024 100 258 | 7/2024 |
| JP | 2001-190031 | 7/2001 |

OTHER PUBLICATIONS

Office Action dated Aug. 14, 2024 for German Patent Application No. 10 2023 123 209.6 and its English translation provided by Applicant's foreign counsel.
Office Action dated Sep. 2, 2025 for Korean Patent Application No. 10-2023-0074814 and its English translation provided by Applicant's foreign counsel.

* cited by examiner

*Primary Examiner* — Carlos Amaya
(74) *Attorney, Agent, or Firm* — WOMBLE BOND DICKINSON (US) LLP

(57) ABSTRACT

Provided is a method for controlling an output voltage in a power supply system, including calculating, by a virtual resistance calculator, a virtual resistance value when a value of a measured output current exceeds a predetermined current limit value; calculating a signal input to a controller based on the calculated virtual resistance value; and generating, by the controller, a signal for controlling an output voltage based on the signal input to the controller.

20 Claims, 8 Drawing Sheets

APPARATUS AND METHOD FOR LIMITING OUTPUT CURRENT USING OUTPUT VOLTAGE CONTROL TECHNIQUE

CROSS-REFERENCE TO RELATED APPLICATION

This application claims priority under 35 U.S.C. § 119 to Korean Patent Application No. 10-2023-0074814, filed on Jun. 12, 2023, in the Korean Intellectual Property Office (KIPO), the disclosure of which is incorporated by reference herein in its entirety.

TECHNICAL FIELD

The present disclosure generally relates to an apparatus and method for limiting output current using an output voltage control technique, and more particularly, to an apparatus and method for limiting output current using a voltage control technique based on a virtual resistance component implemented as software in a power supply system, such as a vehicle-to-load (V2L) system.

BACKGROUND

A vehicle-to-load (V2L) system may refer to a system that supplies power to other devices or loads using a battery of an electric vehicle. For example, the batteries of the electric vehicles can supply the power to household appliances or to sound equipment for an outdoor event. In addition, the batteries of the electric vehicles may be used as a temporary power source in an emergency situation.

However, when electronic products using commercial power are connected to a power supply system such as the V2L, they charge internal capacitors or consume higher power than a product rating for initial operation. From the point of view of the power supply system, an excessive output current may occur for a short time of several seconds, thereby damaging the power supply system. Logic to limit the output current has to be implemented to prevent potential damage to the power supply system due to overcurrent.

In general, when a problem occurs in the power supply system, the power supply system is protected by cutting off a corresponding output by a failsafe logic. However, since the main goal of the power supply system is to provide power that is stable and similar to existing power to the user, it may not be appropriate to cut off the output for a momentary overload. Therefore, a logic that limits a current is required to prevent overcurrent cutoff by a failsafe logic.

In the related art, a method of adding a hardware driver logic circuit is used to control an overcurrent occurring in a power supply system, such as a V2L system. However, using the hardware drive logic for overcurrent protection in the power supply system, such as a V2L system, has the following problems.

1. Fixed component values: In hardware-based solutions, passive components, such as resistors, capacitors, or inductors are generally used to set a current limit value and other parameters. Because these components have fixed values, it is difficult to precisely adjust or change the limits without physically replacing or modifying the components.

2. Sensitivity to component tolerance: The performance of hardware drive logic circuits may be affected by the tolerance of the components in use. Variations in component values due to manufacturing tolerance may cause inconsistency in system performance, making it difficult to achieve precise control and uniform operation in multiple devices.

3. Limited adaptability: Hardware-based solutions generally have limited adaptability to changes in system requirements or operating conditions. For example, modifying a current limit value requires physical changes to the circuit, which may be time consuming and costly.

4. Forced cutoff of PWM output: In order to protect the power supply system from overcurrent, sometimes a PWM output is forcibly cut off, which may result in distortion of am output voltage waveform. A rapid change in a PWM signal may lead to harmonic distortion and degrade the quality of an output voltage, thereby potentially affecting performance of connected devices.

5. Increased design complexity: Integrating the hardware drive logic into the power supply system may require more complex circuit design and layout and additional components. This may increase an overall size, weight and cost of the system while making it more difficult to achieve optimal performance.

In order to overcome the above problems, a new approach, such as a software-based control algorithm, is required.

SUMMARY

In view of the above, some embodiments of the present disclosure may provide an apparatus and method for limiting an output current of a power supply system using an output voltage control technique using a virtual resistance component implemented in software.

Another object of certain embodiments of the present disclosure may be to provide an apparatus and method for applying conventional driver logic implemented in hardware as software.

However, the technical problem to be achieved by the present embodiment is not limited to the technical problem as described above, and other technical problems may exist.

The present disclosure provides a method for limiting an output current in a power supply system, including: calculating, by a virtual resistance calculator, a virtual resistance value when an output current measurement value exceeds a predetermined current limit value; calculating a signal input to a controller based on the calculated virtual resistance value; and generating, by the controller, a signal for controlling an output voltage based on the signal input to the controller.

The predetermined current limit value may be a maximum current value supplied in a power supply system.

The calculating of the virtual resistance value may include: calculating a predicted load resistance value from an output voltage measurement value and the output current measurement value; comparing the calculated predicted load resistance value with a load resistance value at a maximum load; and calculating the virtual resistance value from the load resistance value at the maximum load and the calculated predicted load resistance value when the load resistance value at the maximum load is greater than the calculated predicted load resistance value, wherein when the load resistance value at the maximum load is smaller than the calculated predicted load resistance value, the virtual resistance value may not be calculated or may be the same value as the calculated predicted load resistance value.

The calculating of the signal input to the controller may include: calculating a voltage drop in a virtual resistance from the measured output current value, the current limit value, and the virtual resistance value; calculating a second output voltage command value from the calculated voltage drop in the virtual resistance and a first output voltage command value; and calculating an error value from the second output voltage command value and the measurement value of the output voltage and inputting the error value to the controller.

The controller may be a proportional resonant (PR) controller defined by Equation 1 below:

$$PR = K_P + \frac{K_i \omega_c S}{S^2 + 2\omega_c S + \omega_z^2} \qquad \text{Equation 1}$$

where PR is a transfer function of the PR controller, Kp is a proportional gain, Ki is a resonate gain, $\omega_c$ is a cutoff frequency, and $\omega_z$ is a resonate frequency.

In the generating of the signal for controlling the output voltage, the signal may be generated by adjusting a pulse width modulation (PWM) duty value output from the controller.

The maximum load may be a maximum load for a maximum available power of a power supply system.

The present disclosure provides an output voltage controller including: a virtual resistance calculator configured to calculate, when an output current measurement value exceeds a predetermined current limit value, a virtual resistance from an output voltage measurement value and the output current measurement value; a signal subtractor configured to generate a subtraction signal based on the calculated virtual resistance value and a voltage command value; and a controller configured to generate a signal for controlling an output voltage based on the subtraction signal generated by the signal subtractor.

The predetermined current limit value may be a maximum current value that is supplied in a power supply system.

The virtual resistance calculator may calculate a predicted load resistance value from the output voltage measurement value and the output current measurement value and compare the calculated predicted load resistance value with a load resistance value at a maximum load, and when the load resistance value at the maximum load is greater than the calculated predicted load resistance value, the virtual resistance calculator may calculate the virtual resistance value from the load resistance value at the maximum load and the predicted load resistance value, and when the load resistance value at the maximum load is less than the calculated predicted load resistance value, the virtual resistance value may not be calculated or may be the same value as the calculated predicted load resistance value.

The output voltage controller may calculate a voltage drop in a virtual resistance from the output current measurement value, the current limit value, and the virtual resistance value, and the signal subtractor may include a first signal subtractor configured to generate a second output voltage command value from the calculated voltage drop in the virtual resistance and the first output voltage command value; and a second signal subtractor configured to generate an error value from the second output voltage command value and the output voltage measurement value.

The controller may be a proportional resonant (PR) controller defined by Equation 1 below:

$$PR = K_P + \frac{K_i \omega_c S}{S^2 + 2\omega_c S + \omega_z^2} \qquad \text{Equation 1}$$

where PR is a transfer function of the PR controller, Kp is a proportional gain, Ki is a resonate gain, $\omega_c$ is a cutoff frequency, and $\omega_z$ is a resonate frequency.

The controller may control the output voltage by adjusting a pulse width modulation (PWM) duty value.

The maximum load may be a maximum load for a maximum available power of a power supply system.

The present disclosure provides a method for limiting an output current in a power supply system, including: calculating, by a virtual resistance calculator, a virtual resistance value when an output current measurement value exceeds a predetermined current limit value; calculating a signal input to a controller based on the calculated virtual resistance value; disabling a pulse width modulation (PWM) trip logic when the output current measurement value exceeds the current limit value, and enabling the PWM trip logic when the output current measurement value does not exceed the current limit value; controlling a signal output from a gate driver based on a signal generated by the controller and a signal generated by the PWM trip logic; and controlling a current transferred to a load by controlling a switching unit based on the signal output from the gate driver.

The predetermined current limit value may be a maximum current value supplied in a power supply system.

The calculating of the virtual resistance value may include: calculating a predicted load resistance value from an output voltage measurement value and the output current measurement value; comparing the calculated predicted load resistance value with a load resistance value at a maximum load; and calculating the virtual resistance value from the load resistance value at the maximum load and the calculated predicted load resistance value when the load resistance value at the maximum load is greater than the calculated predicted load resistance value, wherein when the load resistance value at the maximum load is smaller than the calculated predicted load resistance value, the virtual resistance value is the same value as the calculated predicted load resistance value.

The calculating of the signal input to the controller may include: calculating a voltage drop in a virtual resistance from the measured output current value, the current limit value, and the virtual resistance value; calculating a second output voltage command value from the calculated voltage drop in the virtual resistance and a first output voltage command value; and calculating an error value from the second output voltage command value and the measurement value of the output voltage and inputting the error value to the controller.

The maximum load may be a maximum load for a maximum available power of a power supply system.

The signal output from the gate driver may include a pulse width modulation (PWM) signal for controlling a U-phase output and a PWM signal for controlling a V-phase output.

The present disclosure provides an apparatus for limiting an output current in a power supply system, including: an output voltage controller including a virtual resistance calculator configured to calculate a virtual resistance based on an output voltage measurement value and an output current measurement value, a signal subtractor configured to generate a subtraction signal based on the virtual resistance value and a voltage command value, and a controller configured to generate a signal for controlling an output voltage based on the subtraction signal generated by the signal subtractor; and a pulse width modulation (PWM) trip logic configured to control a gate driver in association with a signal from the output voltage controller, wherein the PWM trip logic is disabled when the output current measurement value exceeds the current limit value, and is enabled when the output current measurement value does not exceed the current limit value, a signal output from a gate driver is controlled based on a signal generated by the controller and a signal generated by the PWM trip logic, and a current transferred to a load is controlled by controlling a switching unit based on the signal output from the gate driver.

The predetermined current limit value may be the maximum current value that may be supplied by the power supply system.

The virtual resistance calculator may calculate a predicted load resistance value from an output voltage measurement value and the output current measurement value, compare the calculated predicted load resistance value with a load resistance value at a maximum load, and calculate the virtual resistance value from the load resistance value at the maximum load and the calculated predicted load resistance value when the load resistance value at the maximum load is greater than the calculated predicted load resistance value, wherein when the load resistance value at the maximum load is smaller than the calculated predicted load resistance value, the virtual resistance value may not be calculated or may be the same value as the calculated predicted load resistance value.

The output voltage controller may calculate a voltage drop in a virtual resistance from the output current measurement value, the current limit value, and the virtual resistance value, and the signal subtractor may include a first signal subtractor configured to generate a second output voltage command value from the calculated voltage drop in the virtual resistance and the first output voltage command value; and a second signal subtractor configured to generate an error value from the second output voltage command value and the output voltage measurement value.

The maximum load may be a maximum load for a maximum available power of a power supply system.

The signal output from the gate driver may include a pulse width modulation (PWM) signal for controlling a U-phase output and a PWM signal for controlling a V-phase output.

A computer-readable storage medium according to another embodiment of the present disclosure stores instructions for performing the methods related to the above-described embodiment when executed by a computing system including at least one processor and memory.

According to the present disclosure, since a complicated hardware logic circuit is not required for limiting an output current, production costs may be reduced by reducing the number of devices.

Also, according to the present disclosure, it is possible to actively limit a voltage according to a magnitude of an output current.

In addition, according to the present disclosure, it is possible to reduce logic errors occurring in hardware logic by implementing a hardware gate driver logic in software.

In addition, according to the present disclosure, a current limiting level may be adjusted by software without changing device values.

DETAILED DESCRIPTION

Figure 1:
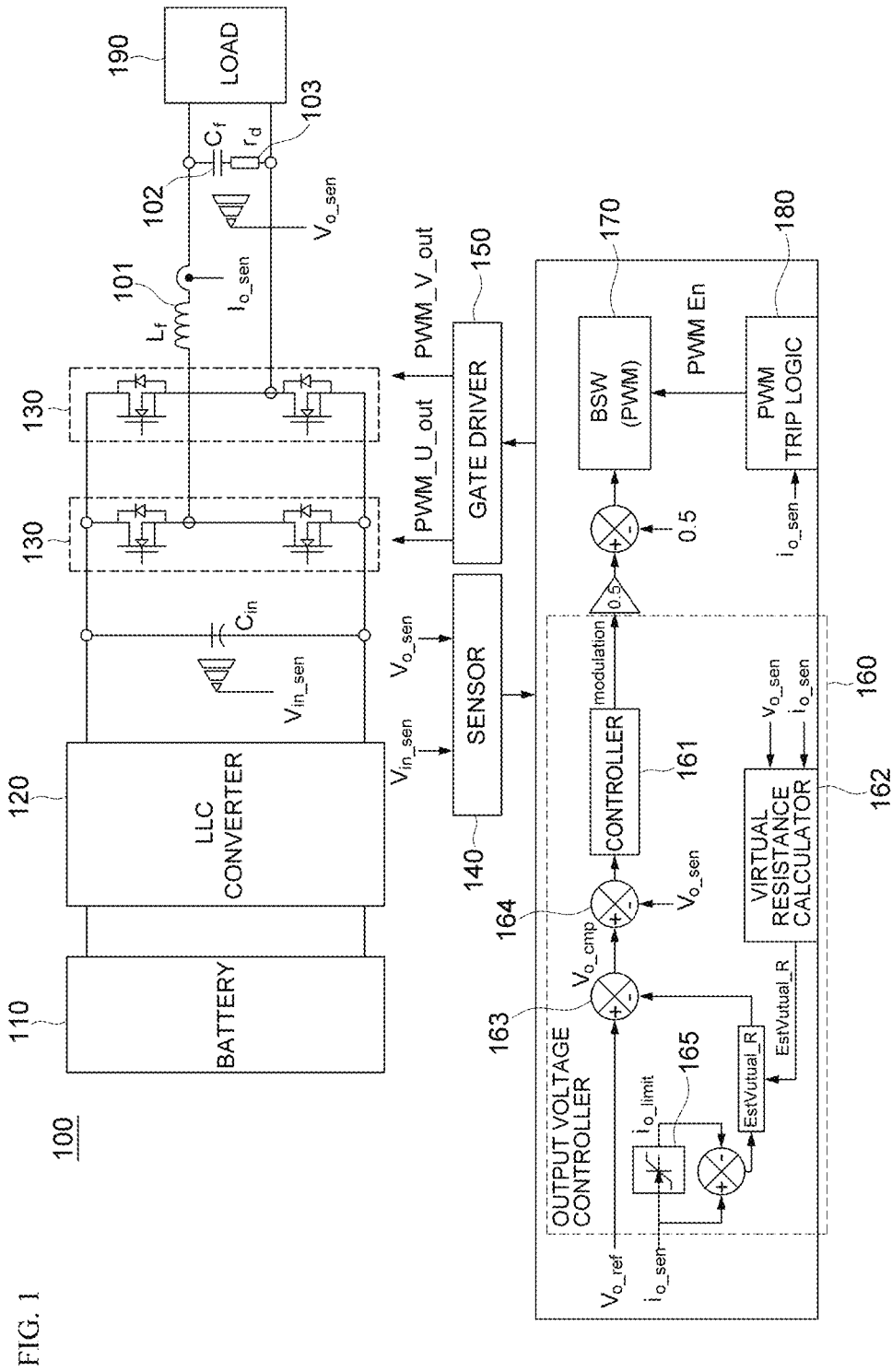
FIG. 1 is a diagram for illustrating a configuration of a power supply system including an output voltage controller according to an embodiment of the present disclosure.

Hereinafter, embodiments will be described in detail with reference to the accompanying tables and drawings such that they may be easily practiced by those skilled in the art to which the present disclosure pertains. As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the scope of the inventive concept are encompassed in the inventive concept.

In the drawings, parts irrelevant to the description are omitted to clearly describe the present disclosure, and like reference numerals denote like elements throughout the specification. In description of drawings, elements indicated by the same name may have different reference numerals depending on the drawings. Reference numerals are only for convenience of description, and a concept, features, functions, or effects of each element are not interpreted in a limiting manner due to a reference numeral thereof.

In describing each drawing, like reference numbers are used for like elements. Terms, such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

If it is not contrarily defined, all terms used herein including technological or scientific terms have the same meanings as those generally understood by a person with ordinary skill in the art.

Terms defined in generally used dictionary shall be construed that they have meanings matching those in the context of a related art, and shall not be construed in ideal or excessively formal meanings unless they are clearly defined in the present application.

Throughout the specification, when a part is referred to as being "connected" to another part, it may not only be "directly connected" to the other part but also may be "electrically connected" to the other part via an intervening element. When a certain part is referred to as "including" a certain component, this does not exclude other components unless described otherwise, and other components may be further included. It should be understood that "including" does not preclude the presence or addition of one or more other features, steps, numbers, operations, components, parts, and combinations thereof.

As used herein, the term "unit" or "module" includes a unit implemented by hardware or software and a unit implemented hardware and software. One unit or module may be implemented using two or more pieces of hardware, and two or more units or modules may be implemented by one piece of hardware.

Hereinafter, an apparatus and method for estimating output current of a low voltage DC converter according to embodiments of the present disclosure will be described in detail with reference to the accompanying drawings.

FIG. 1 is a diagram for illustrating a configuration of a power supply system 100 including an output voltage controller according to an embodiment of the present disclosure.

Referring to FIG. 1, the power supply system 100 for controlling an output voltage may include a battery 110, an inductor-inductor-capacitor (LLC) converter 120, a switching unit 130, a sensor 140, a gate driver 150, an output voltage controller 160, a basic software (BSW) 170, a pulse width modulation (PWM) trip logic 180, a load 190, an inductor 101, a capacitor 102, a resistor 103, a controller 161, a virtual resistance calculator 162, a first signal subtractor 163, a second signal subtractor 164, and a limiter 165. In addition, general-purpose components other than the components shown in FIG. 1 may be further included in the system 100.

The battery 110 may be, for example, but not limited to, a fuel cell stack, which is a group of individual fuel cells connected or stacked together. Each individual fuel cell may produce a small amount of electricity, but the individual fuel cells are coupled or combined to a stack to supply power to an electric vehicle so that sufficient electricity may be produced from the fuel cell stack. The battery 100 of FIG. 1 may be, for example, a high voltage battery for an electric vehicle and may have a form of a fuel cell stack, but not limited thereto.

The LLC converter 120 is a type of switch mode power supply device using a resonant circuit to reduce switching loss and increase efficiency. "LLC" represents a configuration of a resonant tank circuit including two inductors L and one capacitor C. The LLC converter 120 operates by changing a frequency to control the transfer of energy from an input to an output. At a resonant frequency of the LLC converter 120, the reactive elements (the inductors and the capacitor) may basically cancel each other out, and thus, the most power may be transmitted from a primary side to a secondary side without loss. Frequency modulation combined with zero voltage switching (ZVS) or zero current switching (ZCS) characteristics of the LLC converter 120 may reduce switching loss and electromagnetic interference (EMI), thereby being very efficient, especially at higher power levels.

The switching unit 130 may include one or more switches. For example, the switching unit 130 may comprise a full bridge switch including four metal-oxide-semiconductor field-effect transistor (MOSFET) switches. An output of the switching unit 130 is connected to the load 190, the inductor 101 is connected in series between the output of the switching unit 130 and the load 190, and the capacitor 102 and the resistor 103 are connected in parallel. An output voltage Vo_sen at the load 190 may be measured at both ends where the capacitor 102 and the resistor 103 are connected.

Four MOSFET switches included in the switching unit 130 may be controlled by a PWM signal PWM_U_out for controlling a U-phase output and a PWM signal PWM_V_out controlling a V-phase output, and these PWM signals are transmitted from the gate driver 150.

The sensor 140 may measure an input voltage Vin_sen input to both ends of the switching unit 130 and an output voltage Vo_sen at both ends of the load 190 and may measure an output current Io_sen input to the load 190. The output voltage Vo_sen and the output current Io_sen measured by the sensor 140 may be input signals of the virtual resistance calculator 162. The sensors shown in FIG. 1 are an exemplary embodiment for measuring voltage or current, and the number of sensors and a measurement target may be modified as needed by a person skilled in the art.

The gate driver 150 serves as an interface between a control signal and the switching unit 130 (e.g., a full bridge switch).

Hereinafter, the operation of the output voltage controller 160 of FIG. 1 will be described in detail. The output voltage controller 160 may include the controller 161, the virtual resistance calculator 162, the first signal subtractor 163, the second signal subtractor 164, and the limiter 165, and may further include additional components if appropriate or necessary.

Referring to the operation of the output voltage controller 160 of FIG. 1, the output voltage Vo_sen and the output current Io_sen measured by the sensor 140 are input to the virtual resistance calculator 162. The virtual resistance calculator 162 calculates virtual resistance components and outputs virtual resistance. A virtual resistance calculation method of the virtual resistance calculator 162 will be described in detail with reference to FIG. 2 to be described below.

Based on the output current Io_sen and the current limit value Io_limit measured by the sensor 140, a voltage drop VR for the virtual resistance component may be calculated by Equation 1 below. The voltage drop VR may indicate a degree by which an output voltage needs be regulated to keep the power supply system 100 operating within safe limits. The current limit value may be set to a maximum current value that may be supplied by the power supply system 100.

$$v_R = (i_{o\_sen} - i_{o\_limit}) \text{EstVutual\_R} \quad \text{(Equation 1)}$$

where Io_sen is the output current value measured by the sensor 140, Io_limit is the current limit value, and EstVutual_R is the calculated virtual resistance value.

A voltage command Vo_cmp considering, or based on, the voltage drop component calculated by Equation 1 and the virtual resistance component from the command Vo_Ref of the voltage controller is calculated by Equation 2 below.

$$V_{o\_cmp} = V_{o\_ref} - v_R = V_{o\_ref} - (i_o - i_{o\_limit})\text{EstVutual\_R} \quad \text{(Equation 2)}$$

Vo_cmp calculated by Equation 2 is calculated with a measured value of the output voltage to generate an error value, and the generated error value is input to the controller 161. Thereafter, the controller 161 may control the output voltage Vo_sen by controlling a PWM duty value. By using this method, the output voltage may be controlled using the virtual resistance component, and eventually, the output current may also be controlled to decrease due to the decrease in the output voltage.

The controller 161 included in the output voltage controller 160 shown in FIG. 1 may be, for example, but not limited to, a proportional resonant (PR) controller. The proportional resonant (PR) controller may have a control algorithm used in a variety of applications, including electric vehicles (EVs). In an embodiment of the present disclosure, the proportional resonant (PR) controller can use Equation 3 below.

$$PR = K_p + \frac{K_i \omega_c S}{s^2 + 2\omega_c s + \omega_z^2} \quad \text{(Equation 3)}$$

where PR is a transfer function of the PR controller, Kp is a proportional gain, Ki is a resonate gain, $\omega_c$ is a cutoff frequency, and $\omega_z$ is a resonate frequency.

The proportional resonant (PR) controller using Equation 3 presented as an example in the present disclosure may have excellent control performance for a specific frequency component and exhibit characteristics suitable for the purpose of voltage control for the same frequency component as that of commercial power.

The output voltage controller 160, the basic software (BSW) 170, and the PWM trip logic 180 are organically coupled to operate. That is, the PWM trip logic 180 is disabled when the output current measurement value Io_sen (or a value of the measured output current) exceeds the current limit value Io_limit, and is enabled when the output current measurement value Io_sen does not exceed the current limit value Io_limit. A current from the gate driver 150 may be controlled based on a signal generated by the output voltage controller 160 and a signal generated by the PWM trip logic 180.

Figure 2:
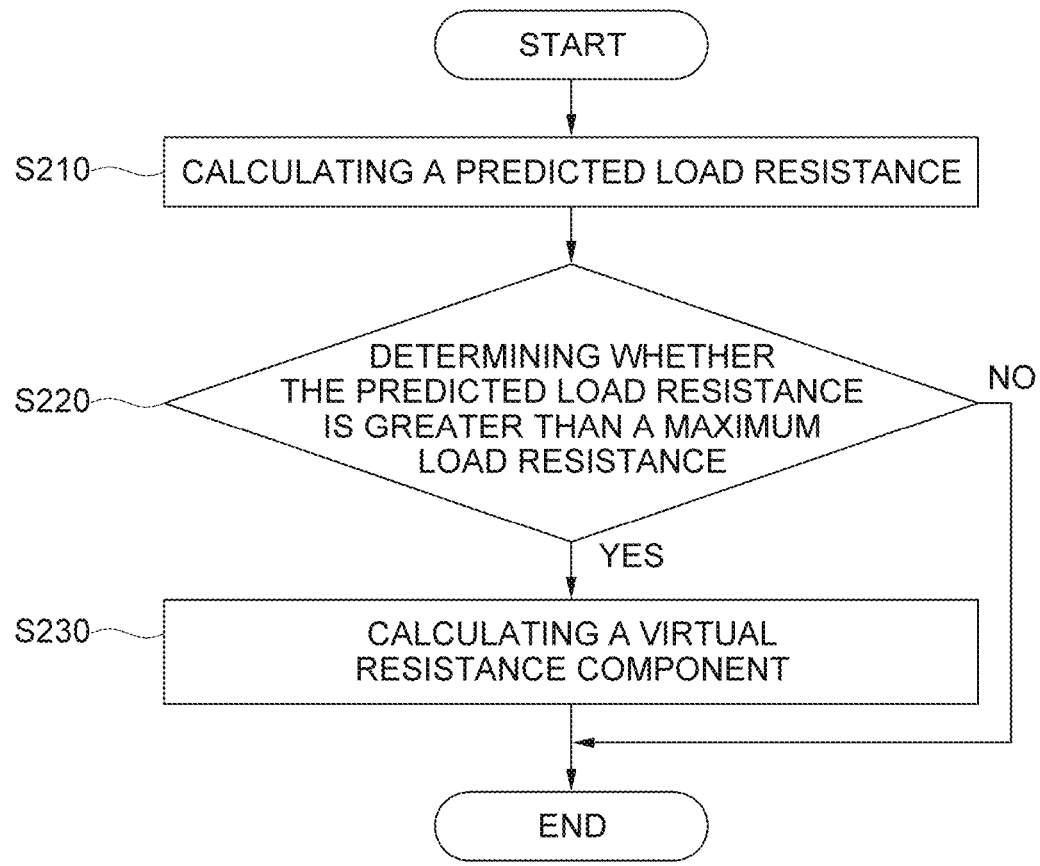
FIG. 2 is a flowchart for illustrating a method of calculating a virtual resistance component according to an embodiment of the present disclosure.

FIG. 2 is a flowchart for illustrating a method of calculating a virtual resistance component according to an embodiment of the present disclosure.

Referring to FIG. 2, first, in operation S210, a value of a predicted load resistance is calculated from an output voltage measurement value measured by a sensor (or a value of an output voltage measured by a sensor) and a current measurement value measured by the sensor (or a value of a current measured by a sensor).

Next, in operation S220, the value of the predicted load resistance and a value of a maximum load resistance are compared with each other to determine whether the value of the predicted load resistance is greater than the value of the maximum load resistance. Here, the maximum load resistance may refer to a load resistance value for maximum power that may be supplied by a power supply system, but may be changed to an acceptable value according to design by a person skilled in the art.

Next, in operation S230, if the value of the maximum load resistance is greater than the value of the predicted load resistance, a virtual resistance component is calculated. For example, a virtual resistance value, which is the virtual resistance component, is calculated by obtaining a difference between the value of the predicted load resistance and the value of the maximum load resistance. If the value of the maximum load resistance is not greater than the value of the predicted load resistance, the power supply system is operating within a stable range, and thus, the virtual resistance component is not calculated.

Using the virtual resistance value calculated in this manner, a voltage command Vo_cmp considering, or based on, the virtual resistance component can be obtained by Equations 1 and 2 described above. The voltage command may be guidelines or commands in the power supply system for a desired output voltage level. The voltage command Vo_cmp is calculated with the measurement value of the output voltage to generate an error value. This error value usually or generally represents discrepancy between the desired output voltage and the actual output voltage. Finally, the generated error value is input to the controller 161, so that the controller 161 may control the output voltage. The use of virtual resistors may allow for more accurate and responsive control of the output voltage, and thus, the overall performance and reliability of the power supply system may be improved.

Figure 3:
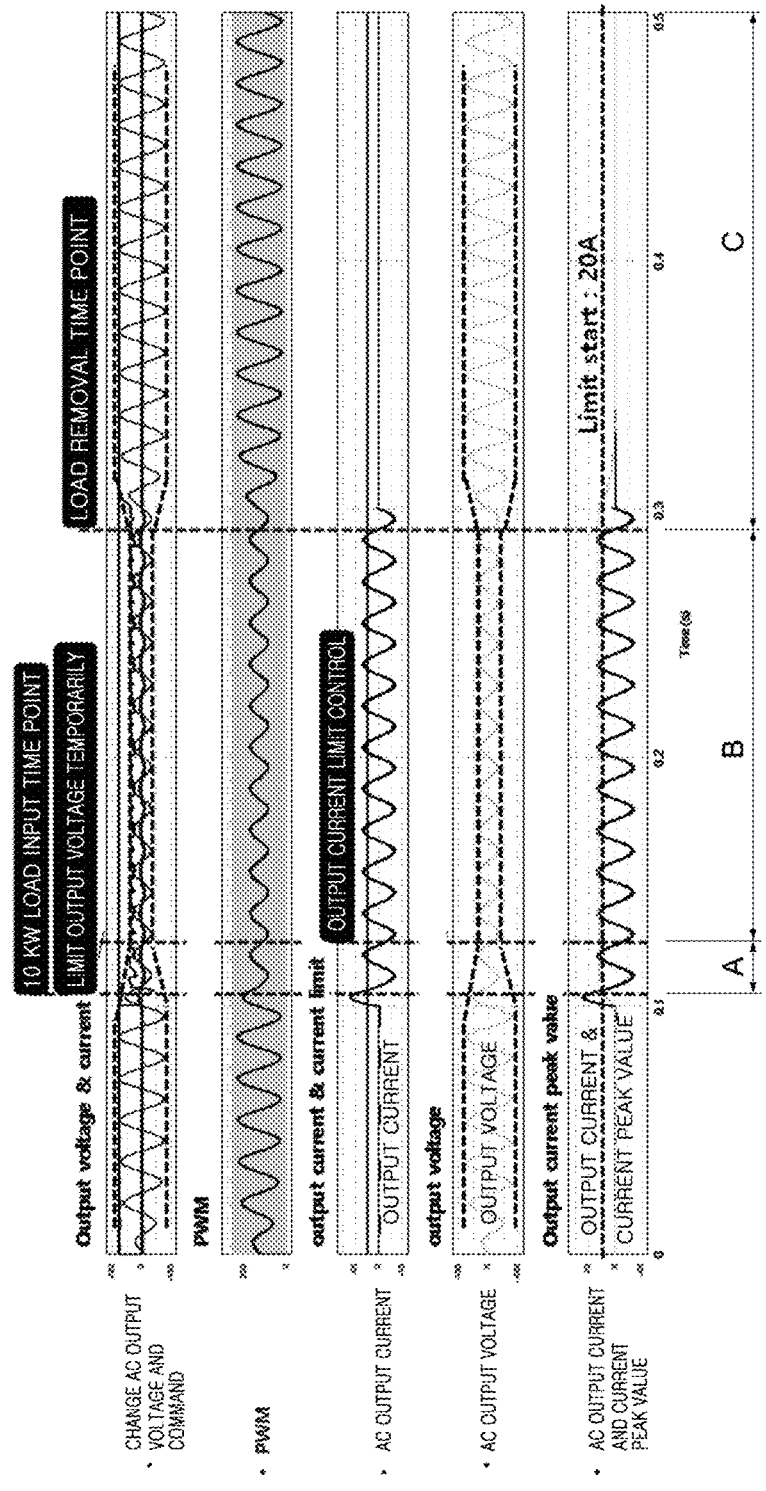
FIG. 3 is a graph for illustrating a simulation of output voltage control using a virtual resistance component according to an embodiment of the present disclosure.

FIG. 3 is a graph for illustrating a simulation of output voltage control using a virtual resistance component according to an embodiment of the present disclosure.

FIG. 3 illustrates that an AC output current exceeds an output current limit value in the vicinity of 0.1 seconds, which is a time point at which a load of 10 KW is applied, and, as an AC output voltage and command at that time are changed, an output voltage is limited. That is, section A (approximately 0.1 seconds to 0.12 seconds) indicated by a first dotted line from 0.1 seconds is a section in which the estimation of a virtual resistance value is performed because the AC output current exceeds the output current limit value. In this section, it can be seen that the output voltage is reduced due to a voltage drop caused by the virtual resistance.

Section B (approximately 0.12 seconds to 0.3 seconds) represents a section in which the estimation of the virtual resistance component is completed. That is, since the voltage drop by the virtual resistance is constant, the output voltage may also be controlled to be a certain magnitude.

Section C (after about 0.3 seconds) represents a section in which the load is removed and the output voltage is returned, and in this section, the virtual resistance component is removed to return the output voltage to an original state thereof. That is, the power supply system is stabilized and the AC output returns to an original state thereof. This means that the output voltage and current return to previous levels thereof before the 10 kW load was applied.

Figure 4:
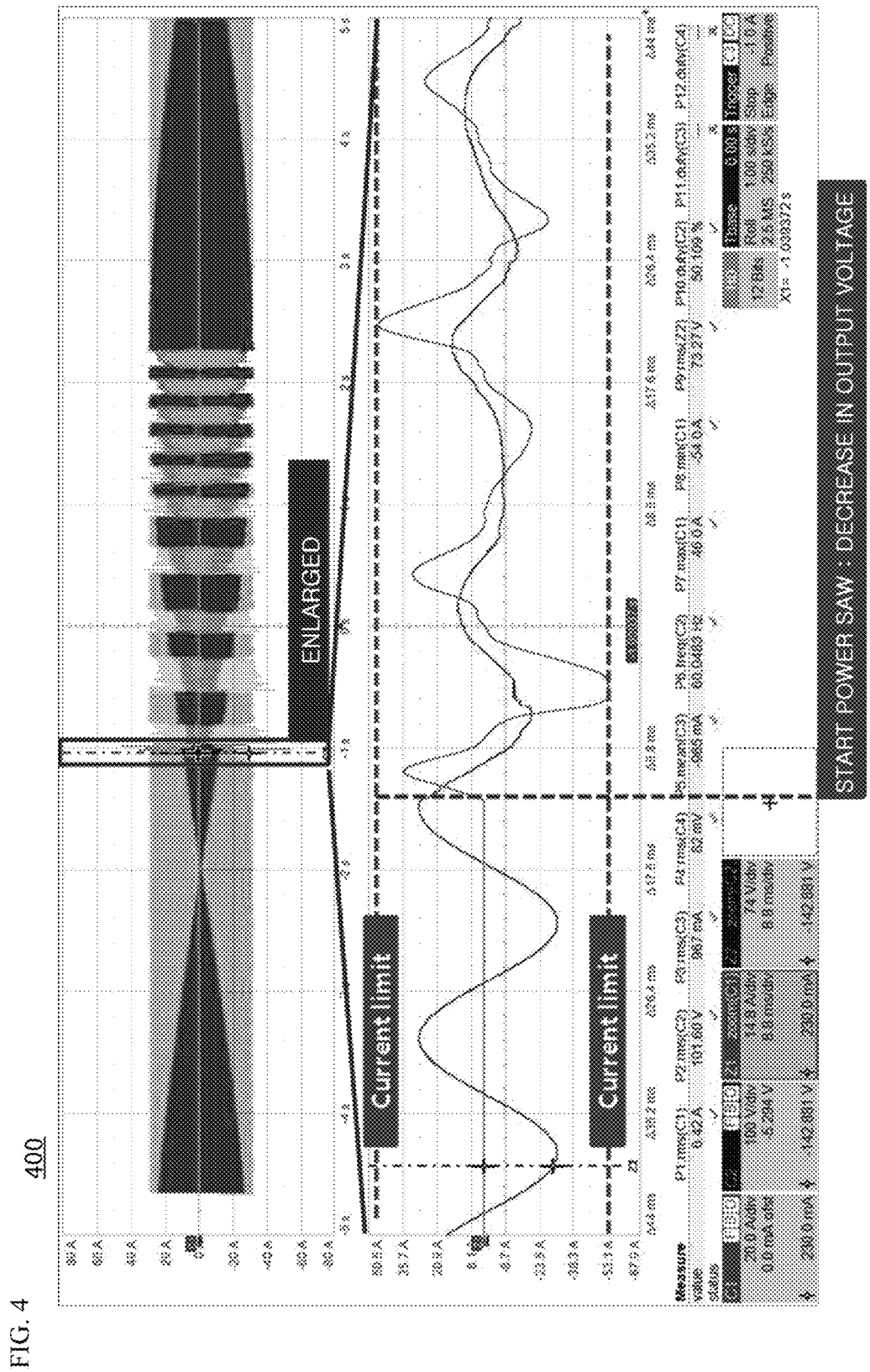
FIG. 4 is a graph for illustrating a decrease in output voltage according to starting of a power or electric saw according to an embodiment of the present disclosure.

FIG. 4 is a graph for illustrating a decrease in output voltage according to starting of a power or electric saw according to an embodiment of the present disclosure.

In FIG. 4, the vicinity of −1s is shown in a enlarged manner. After a load is connected, current exceeds a lower limit (−53.1A) of the current limit at −1.000037s, and voltage at this time decreases.

Figure 5:
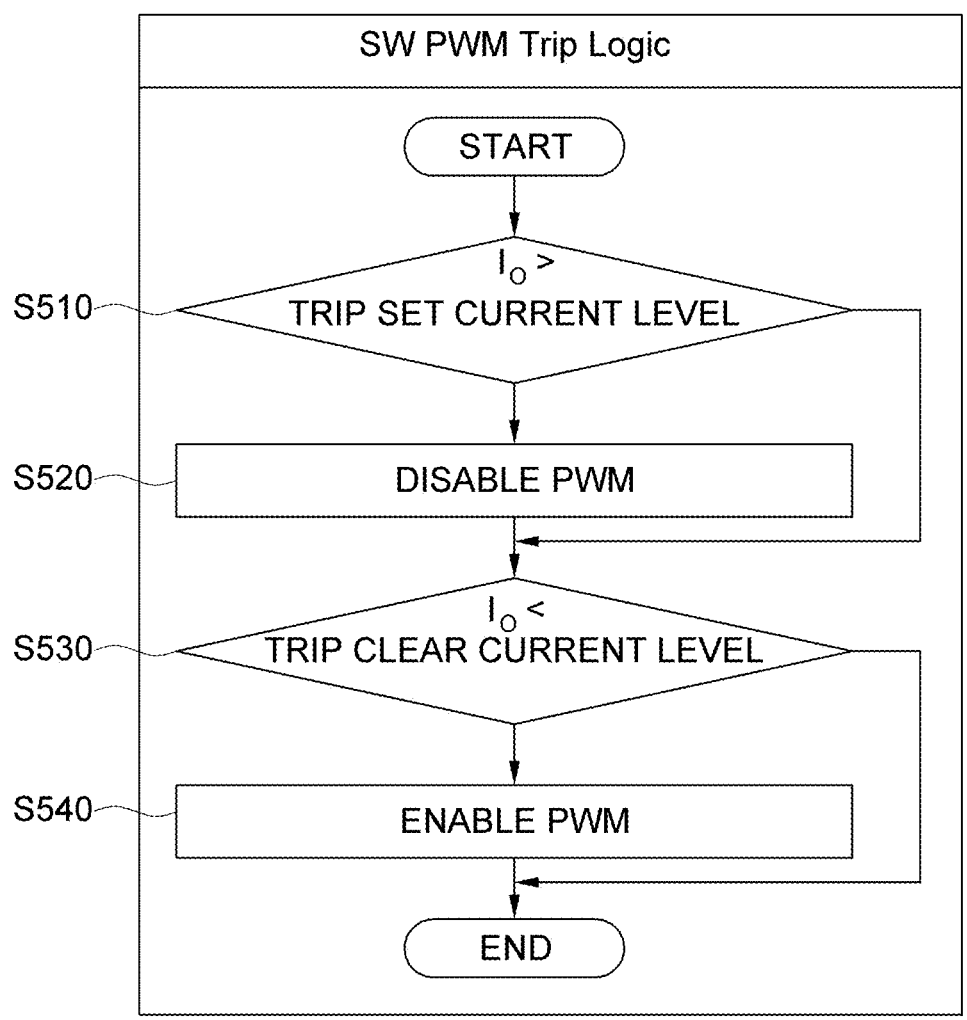
FIG. 5 is a flowchart for illustrating an operating process of a software PWM trip logic according to an embodiment of the present disclosure.

FIG. 5 is a flowchart for illustrating an operation of a software PWM trip logic according to an embodiment of the present disclosure.

Referring to FIG. 5, in operation S510, it is determined whether an output current Io_sen measured by the sensor is greater than a trip set current level, and when it is determined that the output current is greater than the trip current level, the PWM trip logic is disabled in operation S520. At this time, a PWM low output of the inverter is maintained. Also, a switch of the inverter is maintained in an OFF state. This means that a duty cycle of the PWM signal decreases. As a result, an output voltage can be lowered, and therefore, the output current also can be lowered.

Thereafter, when it is determined that the output current detected by the sensor is not greater than the trip current level in operation S530, the PWM trip logic is re-enabled in operation S540. At this time, the PWM of the inverter maintains a normal output. That is, the duty cycle of the PWM signal returns to a normal value. As a result, the output voltage and current return to normal levels.

FIG. 6(a) is a graph for illustrating AC output voltage according to an embodiment of the present disclosure, and FIG. 6(b) is a graph for illustrating AC output current according to an embodiment of the present disclosure.

Figure 6:
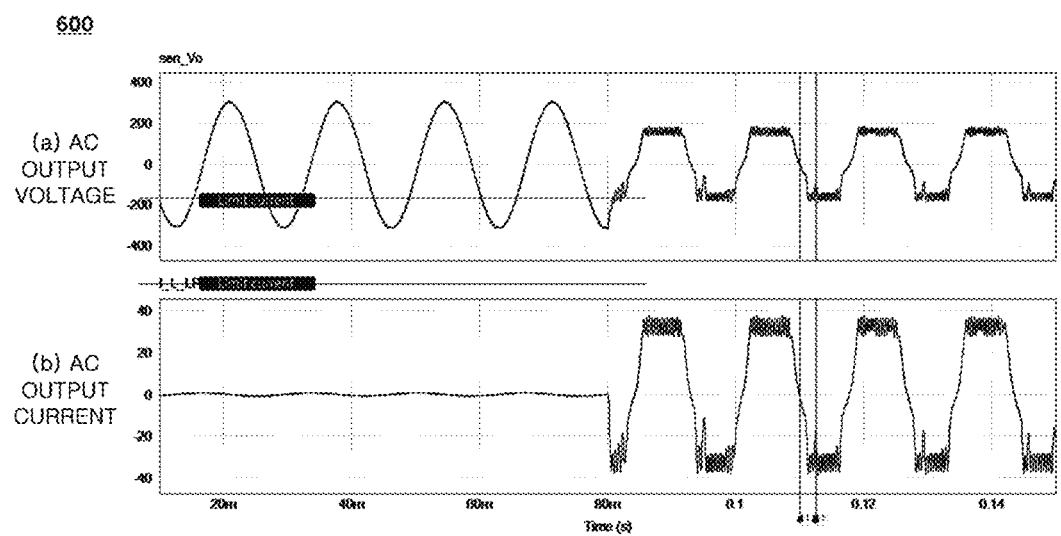
FIG. 6 is a graph illustrating AC output voltage and AC output current according to an embodiment of the present disclosure.

Referring to FIG. 6, it can be seen that an AC output voltage is output with a constant value, and then the magnitude of the output voltage decreases from a time point at which the output voltage exceeds a current limit value in the vicinity of 80 ms. That is, when the output current is greater than the current limit value, the PWM trip logic is activated, the inverter switch is maintained in an OFF state, and the inverter PWM maintains a low output.

Specifically, when the AC output current does not exceed the output limit value, the AC voltage is output as a constant value. This generally corresponds to a desirable operation for inverters because a consistent voltage should be provided, regardless of the load to which power is supplied.

However, at about 80 ms, a time point at which the load is connected to a power supply system, the current starts to exceed a predetermined limit. Here, when the output current exceeds the current limit, the PWM trip logic is activated to reduce the output voltage. At this time, the inverter switch is in the OFF state, and the inverter PWM maintains a low output. This means that a duty cycle of the PWM signal is reduced so that the output voltage and current can decrease, and may be a protective measure to prevent overcurrent from being supplied to the power supply system.

Figure 7:
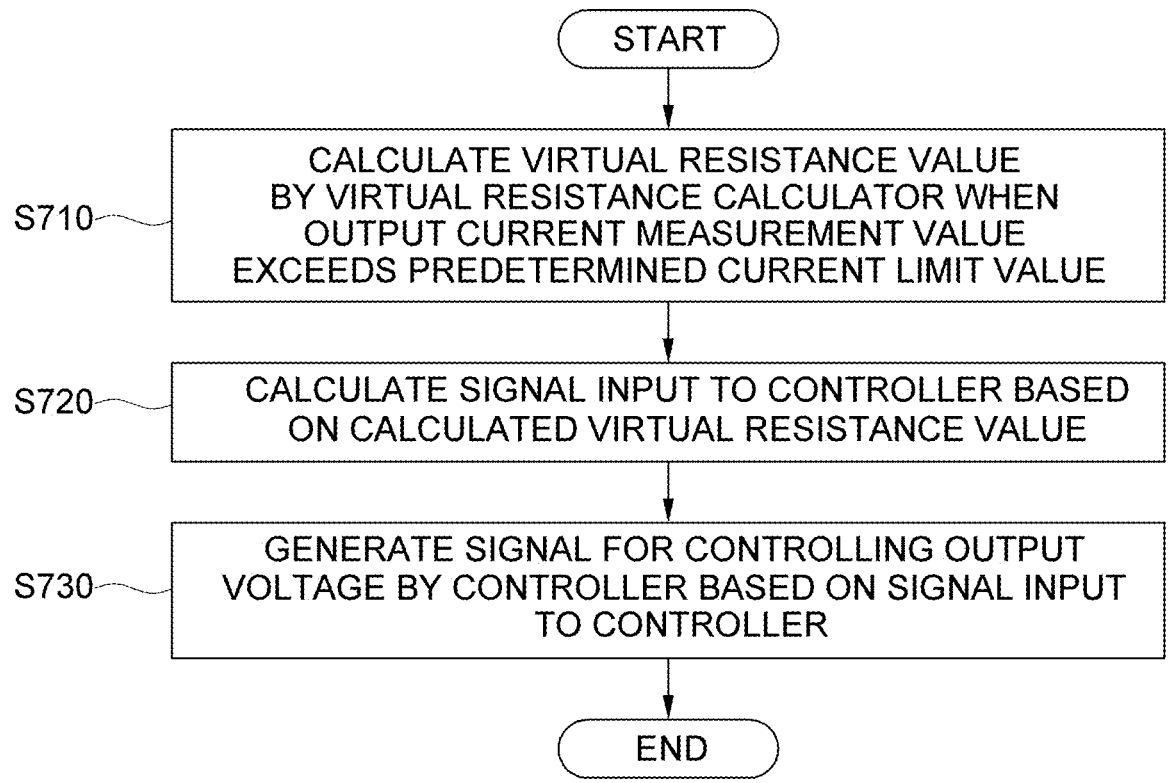
FIG. 7 is a flowchart for illustrating a method of controlling an output voltage in an output voltage controller according to an embodiment of the present disclosure.

FIG. 7 is a flowchart for illustrating a method of controlling an output voltage by an output voltage controller according to an embodiment of the present disclosure.

First, at operation S710, when it is determined that a measurement value of an output current exceeds a predetermined current limit value, a virtual resistance value is calculated by a virtual resistance calculator. Here, the predetermined current limit value may be set to be a maximum current value that may be supplied by the power supply system.

As an example, the operation S710 of calculating the virtual resistance value may include calculating a predicted load resistance value from a value of a measured output voltage and a value of a measured output current; comparing the calculated predicted load resistance value with a load resistance value at the maximum load; and calculating a virtual resistance value from the load resistance value at the maximum load and the calculated predicted load resistance value when the load resistance value at the maximum load is greater than the calculated predicted load resistance value. If the load resistance value at maximum load is smaller than the calculated predicted load resistance value, the virtual resistance value may not be calculated or may have the same value as the calculated predicted load resistance value.

Next, a signal input to the controller is generated or calculated based on the virtual resistance value calculated in operation S720.

As an example, the operation of generating or calculating a signal input to the controller (operation S720) may include calculating a voltage drop in a virtual resistance from the output current measurement value, the current limit value, and the virtual resistance value; calculating a second output voltage command value from the calculated voltage drop of the virtual resistance and the first output voltage command value; and calculating an error value from the second output voltage command value and the measurement value of the output voltage and inputting the error value to the controller.

Next, in operation S730, the controller generates a signal for controlling the output voltage based on the signal input to the controller. As an example, the generating of the signal for controlling the output voltage may be performed by adjusting a PWM duty value output from the controller.

Meanwhile, it should be noted that the order of the operations in FIG. 7 may be modified, and a time-series order may be changed and some or all operations may be performed simultaneously according to the need of design by a person skilled in the art.

Figure 8:
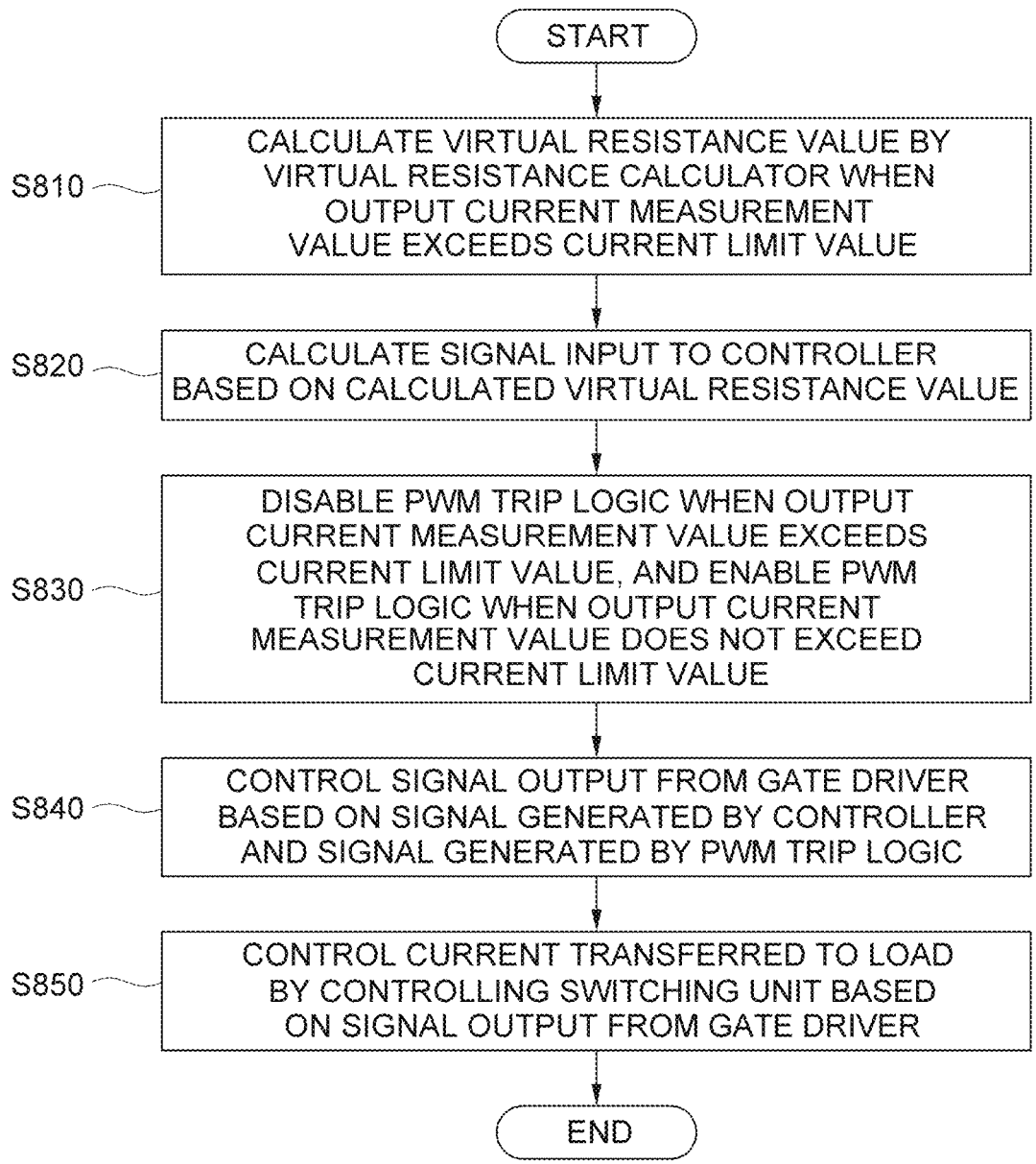
FIG. 8 is a flowchart for illustrating a method of limiting output current in a power supply system according to an embodiment of the present disclosure.

FIG. 8 is a flowchart for illustrating a method of limiting output current in a power supply system according to an embodiment of the present disclosure.

First, in operation S810, when an output current measurement value (or a value of a measured output current) exceeds a predetermined current limit value, the virtual resistance calculator calculates a virtual resistance value. Here, the predetermined current limit value may be set to a maximum current value that may be supplied by the power supply system.

As an example, the operation of calculating the virtual resistance value (operation S810) may include calculating a predicted load resistance value from the output voltage value and the output current measurement value (or a value of a measured output current); comparing the calculated predicted load resistance value with a load resistance value at a maximum load; and calculating a virtual resistance value from the load resistance value at the maximum load and the calculated predicted load resistance value when the load resistance value at the maximum load (e.g., a maximum load for maximum available power in the power supply system) is greater than the calculated predicted load resistance value. If the output current measurement value does not exceed the current limit value, the virtual resistance calculator may not calculate the virtual resistance value, or may use the same value as the calculated predicted load resistance value.

Next, in operation S820, a signal input to the controller is calculated based on the virtual resistance value.

As an example, operation S820 of calculating the signal input to the controller may include calculating a voltage drop of the virtual resistance from the output current measurement value, the current limit value, and the virtual resistance value; calculating an updated output voltage command value considering, or based on, a virtual resistance component from the calculated voltage drop of the virtual resistance and an output voltage command value; calculating an error value from the updated output voltage command value and an output voltage; and inputting the calculated error value to the controller.

Next, in operation S830, when the output current measurement value exceeds the predetermined current limit value, the PWM trip logic is disabled, and when the output current measurement value does not exceed the current limit value, the PWM trip logic is enabled.

Next, in operation S840, a signal output from the gate driver is controlled based on the signal generated by the controller and the signal generated by the PWM trip logic. For example, the signal output from the gate driver may include a PWM signal for controlling a U-phase output and a PWM signal for controlling a V-phase output.

Next, in operation S850, current provided or transferred to the load is controlled by controlling the switching unit based on the signal output from the gate driver.

Meanwhile, it should be noted that it is possible to change the time-series order of each operation of FIG. 8 and perform some or all operations simultaneously according to the need of design by a person skilled in the art.

The embodiments described in FIGS. 1 to 8 may be stored in a computer-readable storage medium and executed by a computing system including at least one processor and memory. Examples of computer-readable medium include magnetic medium, such as hard disks, floppy disks, and magnetic tape; optical medium, such as CD ROM disks and DVDs; magneto-optical medium, such as floptical disks; and hardware devices that are specially configured to store and perform program instructions, such as read-only memory (ROM), random access memory (RAM), flash memory, and the like. Examples of program instructions include both machine code, such as produced by a compiler, and higher level code that may be executed by the computer using an interpreter or the like.

The above description of the example embodiments is provided for the purpose of illustration, and it would be understood by those skilled in the art that various changes and modifications may be made without changing technical conception and essential features of the example embodiments.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

[Detailed Description of Main Elements]

| | |
|---|---|
| 100: power supply system | 101: inductor |
| 102: capacitor | 103: resistor |
| 110: battery | 120: LLC converter |
| 130: switching unit | 140: sensor |
| 150: gate driver | 160: output voltage controller |
| 161: controller | 162: virtual resistance calculator |
| 163: first signal subtractor | 164: second signal subtractor |
| 165: limiter | 170: BSW |
| 180: PWM trip logic | 190: load |

What is claimed is:

1. An output voltage controller comprising:
one or more processors; and
memory configured to store instructions that, when executed by the one or more processors, cause the one or more processors to perform operations that include:
when a measured output current exceeds a predetermined current limit, calculating a virtual resistance based on a measured output voltage and the measured output current;
generating a subtraction signal based on the calculated virtual resistance and a voltage command value; and
generating a signal for controlling an output voltage based on the subtraction signal generated based on the calculated virtual resistance and the voltage command value.

2. The output voltage controller of claim 1, wherein the predetermined current limit value is a maximum current value supplied by a power supply system.

3. The output voltage controller of claim 1, wherein the one or more processors are configured to:
calculate a predicted load resistance value based on the measured output voltage and the measured output current, and compare the calculated predicted load resistance value with a load resistance value at a maximum load;
when the load resistance value at the maximum load is greater than the calculated predicted load resistance value, calculate the virtual resistance based on the load resistance value at the maximum load and the calculated predicted load resistance value; and
when the load resistance value at the maximum load is less than the calculated predicted load resistance value, set the virtual resistance to be the calculated predicted load resistance value.

4. The output voltage controller of claim 1, wherein the one or more processors are configured to:
calculate a voltage drop in the virtual resistance based on the measured output current, the predetermined current limit value, and the virtual resistance, and
generate a first output voltage command value based on the calculated voltage drop in the virtual resistance and a second output voltage command value; and
calculate an error value between the first output voltage command value and the measured output voltage.

5. The output voltage controller of claim 1, wherein the one or more processors are configured to generate the signal for controlling the output voltage using a transfer function of a proportional resonant (PR) controller defined by Equation 1:

$$PR = K_P + \frac{K_i \omega_c S}{S^2 + 2\omega_c S + \omega_z^2}$$

where PR is a transfer function of the PR controller, Kp is a proportional gain, Ki is a resonate gain, $\omega_c$ is a cutoff frequency, and $\omega_z$ is a resonate frequency.

6. The output voltage controller of claim 1, wherein the one or more processors are configured to generate the signal for controlling the output voltage to control the output voltage by adjusting a pulse width modulation (PWM) duty value.

7. The output voltage controller of claim 3, wherein the maximum load is a maximum load for a maximum available power of a power supply system.

8. A method for limiting an output current in a power supply system, the method comprising:
calculating a virtual resistance when a measured output current exceeds a predetermined current limit;
calculating a signal input to a controller, configured to control an output voltage or an output current, based on the calculated virtual resistance;
controlling a pulse width modulation (PWM) trip logic depending on whether the measured output current exceeds the predetermined current limit;
controlling a signal output from a gate driver, configured to control a switching unit comprising one or more switches, based on a signal generated by the controller and a signal generated by the PWM trip logic; and
controlling a current provided to a load by controlling the switching unit based on the signal output from the gate driver.

9. The method of claim 8, wherein the controlling of the pulse width modulation PWM trip logic comprises:
when the measured output current exceeds the predetermined current limit, disabling the PWM trip logic; and
when the measured output current is below the predetermined current limit, enabling the PWM trip logic.

10. The method of claim 8, wherein the predetermined current limit value is a maximum current value supplied by the power supply system.

11. The method of claim 8, wherein the calculating of the virtual resistance comprises:
   calculating a predicted load resistance value based on a measured output voltage and the measured output current;
   comparing the calculated predicted load resistance value with a load resistance value at a maximum load;
   when the load resistance value at the maximum load is greater than the calculated predicted load resistance value, calculating the virtual resistance based on the load resistance value at the maximum load and the calculated predicted load resistance value; and
   when the load resistance value at the maximum load is less than the calculated predicted load resistance value, setting the virtual resistance to be the calculated predicted load resistance value.

12. The method of claim 8, wherein the calculating of the signal input to the controller includes:
   calculating a voltage drop in the virtual resistance based on the measured output current, the predetermined current limit value, and the virtual resistance;
   calculating a first output voltage command value based on the calculated voltage drop in the virtual resistance and a second output voltage command value; and
   calculating an error value between the first output voltage command value and the measured output voltage, and inputting the error value to the controller.

13. The method of claim 11, wherein the maximum load is a maximum load for a maximum available power of the power supply system.

14. The method of claim 8, wherein the signal output from the gate driver includes a PWM signal for controlling a first-phase output and a PWM signal for controlling a second-phase output.

15. An apparatus for limiting an output current in a power supply system, the apparatus comprising:
   an output voltage controller configured to calculate a virtual resistance based on a measured output voltage and a measured output current, generate a subtraction signal based on the virtual resistance and a voltage command value, and generate a signal for controlling an output voltage based on the subtraction signal generated based on the virtual resistance and the voltage command value; and
   a pulse width modulation (PWM) trip logic configured to control a gate driver, configured to control a switching unit comprising one or more switches, in response to the signal for controlling the output voltage generated from the output voltage controller, wherein:
   the PWM trip logic is configured to be disabled when the measured output current exceeds a predetermined current limit value, and be enabled when the measured output current does not exceed the predetermined current limit value,
   a signal output from the gate driver is controlled based on the signal for controlling the output voltage generated from the output voltage controller and a signal generated by the PWM trip logic, and
   a current provided to a load is controlled by controlling the switching unit based on the signal output from the gate driver.

16. The apparatus of claim 15, wherein the predetermined current limit value is a maximum current value supplied by the power supply system.

17. The apparatus of claim 15, wherein the output voltage controller is configured to:
   calculate a predicted load resistance value based on a measured output voltage and the measured output current;
   compare the calculated predicted load resistance value with a load resistance value at a maximum load;
   when the load resistance value at the maximum load is greater than the calculated predicted load resistance value, calculate the virtual resistance based on the load resistance value at the maximum load and the calculated predicted load resistance value; and
   when the load resistance value at the maximum load is less than the calculated predicted load resistance value, set the virtual resistance to be the calculated predicted load resistance value.

18. The apparatus of claim 15, wherein the output voltage controller is configured to:
   calculate a voltage drop in the virtual resistance based on the measured output current, the predetermined current limit value, and the virtual resistance;
   generate a first output voltage command value based on the calculated voltage drop in the virtual resistance and a second output voltage command value; and
   calculate an error value between the first output voltage command value and the measured output voltage.

19. The apparatus of claim 17, wherein
   the maximum load is a maximum load for a maximum available power of the power supply system.

20. The apparatus of claim 15, wherein
   the signal output from the gate driver includes a PWM signal for controlling a first-phase output and a PWM signal for controlling a second-phase output.

* * * * *